US007382743B1

(12) United States Patent
Rao et al.

(10) Patent No.: US 7,382,743 B1
(45) Date of Patent: Jun. 3, 2008

(54) MULTIPLE-BEAM ANTENNA SYSTEM USING HYBRID FREQUENCY-REUSE SCHEME

(75) Inventors: Sudhakar Rao, Churchville, PA (US); Mysore Sheshadri, Princeton Junction, NJ (US); Jim Wang, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 603 days.

(21) Appl. No.: 11/029,364

(22) Filed: Jan. 6, 2005

Related U.S. Application Data

(60) Provisional application No. 60/599,031, filed on Aug. 6, 2004.

(51) Int. Cl.
*H04B 7/185* (2006.01)
*H04Q 7/00* (2006.01)

(52) U.S. Cl. ...................................... 370/316; 370/334

(58) Field of Classification Search ..................... None
See application file for complete search history.

(56) References Cited

U.S. PATENT DOCUMENTS

| | | | | |
|---|---|---|---|---|
| 4,792,814 | A | 12/1988 | Ebisui | |
| 5,117,240 | A | 5/1992 | Anderson et al. | |
| 5,166,698 | A | 11/1992 | Ashbaugh et al. | |
| 5,974,323 | A * | 10/1999 | Doner | 455/447 |
| 6,075,484 | A * | 6/2000 | Daniel et al. | 342/372 |
| 6,084,552 | A | 7/2000 | Robertson et al. | |
| 6,108,561 | A * | 8/2000 | Mallinckrodt | 455/522 |
| 6,240,072 | B1 * | 5/2001 | Lo et al. | 370/316 |
| 6,336,030 | B2 * | 1/2002 | Houston et al. | 455/13.2 |
| 6,377,561 | B1 * | 4/2002 | Black et al. | 370/330 |
| 6,384,795 | B1 | 5/2002 | Bhattacharyya et al. | |
| 6,396,453 | B2 | 5/2002 | Amyotte et al. | |
| 6,441,795 | B1 | 8/2002 | Volman | |
| 6,522,306 | B1 | 2/2003 | Parrikar et al. | |
| 2003/0034422 | A1 * | 2/2003 | Higgins | 244/158 R |
| 2005/0245265 | A1 * | 11/2005 | Nascimbene et al. | 455/447 |
| 2007/0225002 | A1 * | 9/2007 | Keller et al. | 455/448 |

OTHER PUBLICATIONS

Sudhaker K. Rao, "Parametric Design and Analysis of Multiple-Beam Reflector Antennas for Satellite Communications," IEEE Antennas and Propagation Magazine, Aug. 2003, pp. 28-34, vol. 45, No. 4.

* cited by examiner

*Primary Examiner*—Andrew C. Lee
(74) *Attorney, Agent, or Firm*—McDermott Will & Emery LLP

(57) ABSTRACT

Antenna system and methodology for producing multiple interleaved beams using a hybrid frequency-reuse scheme. In particular, depending on the traffic demand in specific coverage areas, some beams are assigned with frequency channels in accordance with a 4-cell frequency-reuse scheme, and the other beams are assigned with frequency channels in accordance with a 7-cell frequency-reuse scheme. The antenna system has multiple feeds divided into clusters, and a number of reflectors fed by respective feed clusters and configured to form one beam for each of the feeds.

12 Claims, 15 Drawing Sheets

MULTIPLE-BEAM ANTENNA SYSTEM USING HYBRID FREQUENCY-REUSE SCHEME

The present application claims priority of U.S. provisional patent application No. 60/599,031 filed Aug. 6, 2004, and entitled "ENHANCED MULTIPLE BEAM ANTENNA SYSTEM," the entire disclosure of which is incorporated by reference herein.

FIELD OF THE INVENTION

This disclosure relates to antenna systems and, more particularly, to an antenna system for producing multiple uplink and downlink beams that support a hybrid frequency-reuse scheme.

BACKGROUND ART

Over the last few years, there has been a tremendous growth in the use of multiple-beam antenna systems for satellite communications. For example, multiple-beam antennas are currently being used for direct-broadcast satellites (DBS), personal communication satellites (PCS), military communication satellites, and high-speed Internet applications. These antennas provide mostly contiguous coverage over a specified field of view on Earth by using high-gain multiple spot beams for downlink (satellite-to-ground) and uplink (ground-to-satellite) coverage.

Fixed Satellite Service (FSS) and Broadcast Satellite Service (BSS) payloads require that the spectral resource use be optimized, in order to enable several satellite operators to efficiently share a limited frequency spectrum. For satellite systems that require multiple spot beams to contiguously cover a large geographic coverage region, key performance parameters include the frequency-reuse factor and the co-polar isolation (C/I). For the downlink coverage, the co-polar isolation is usually more critical than for the uplink coverage. This parameter may be defined as the ratio of the co-polar directivity of the beam of interest to the combined directivity interference of all the beams that reuse the same frequency and is obtained by adding all the interferers, in power over the beam of interest.

To cover a large number of cells in the coverage region, conventional satellite systems utilize multiple-cell frequency-reuse schemes with a fixed number of cells using the same frequency channels. For example, a 4-cell frequency-reuse scheme or a 7-cell frequency-reuse scheme may be utilized. However, these known frequency-reuse schemes have some drawbacks. While the 4-cell frequency-reuse scheme provides a high system capacity and a high frequency-reuse factor, it has low C/I values. By contrast, the 7-cell frequency-reuse scheme limits the system capacity, but has better C/I values that makes the system inoperable. In addition, both these fixed-cell reuse schemes do not cater for non-uniform traffic demands based on geographic population of the coverage region. For example, the eastern and western regions of the Continental United States (CONUS) have higher spectral demand than the mountain and central regions.

Hence, there is a need for a multiple-beam antenna system supporting a hybrid frequency-reuse scheme that would provide a required system capacity with a sufficient co-polar isolation.

SUMMARY OF THE DISCLOSURE

The present disclosure offers novel antenna system and methodology for producing multiple interleaved beams. The antenna system comprises multiple feeds divided into clusters, and a number of reflectors fed by respective feed clusters and configured to form one beam for each of the feeds.

In accordance with one aspect of the disclosure, the antenna system is configured to assign the multiple interleaved beams with frequency channels in accordance with a hybrid frequency-reuse scheme. In particular, at least a first group of the multiple beams is assigned with frequency channels in accordance with a first frequency-reuse scheme, and at least a second group of the multiple beams is assigned with the frequency channels in accordance with a second frequency-reuse scheme which is different from the first frequency-reuse scheme.

The first group of the beams may correspond to a first coverage area, and the second group of the beams may correspond to a second coverage area. For example, one group of the beams covering the East Coast of the USA may be assigned with frequency channels in accordance with a 4-cell frequency-reuse scheme, and another group of the beams covering the mid-West region of the USA may be assigned with frequency channels in accordance with a 7-cell frequency-reuse scheme.

The frequency-reuse scheme may be selected in accordance with traffic demands in areas covered by respective beams. In particular, the 4-cell frequency-reuse scheme may be utilized in the areas with higher traffic demand, and the 7-cell frequency-reuse scheme may be used in the areas with lower demand. Hence, the antenna system is able to substantially increase the system capacity while minimizing the interference between the beams reusing the same frequency channels.

In accordance with another aspect of the invention, a separate reflector is configured to accommodate a feed cluster including a plurality of feeds. The reflector is capable of providing transmission and reception at separated transmission and reception frequency bands covering frequency channels assigned to the beams corresponding to the respective feeds. This enables to reduce the numbers of reflectors required by a factor of two (4 reflectors, instead of 8 as an example).

In accordance with a further aspect of the invention, a surface of each reflector is shaped to broaden receive beams and maintain a predetermined beam size at both transmission and reception frequency bands. The surface of each reflector is also shaped such that the co-polar isolation (C/I) is improved at the 4 cell reuse distance.

In accordance with a method of the present disclosure, multiple interleaved beams are assigned with frequency channels in accordance with a hybrid frequency-reuse scheme. In particular, at least a first group of the multiple beams is assigned with the frequency channels in accordance with a first frequency-reuse scheme, and at least a second group of the multiple beams is assigned with the frequency channels in accordance with a second frequency-reuse scheme different from the first frequency-reuse scheme.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made with an example of a four-aperture antenna system. It will become apparent, however, that the concepts described herein are applicable to an antenna system having any number of reflectors for producing multiple beams.

Figure 1:
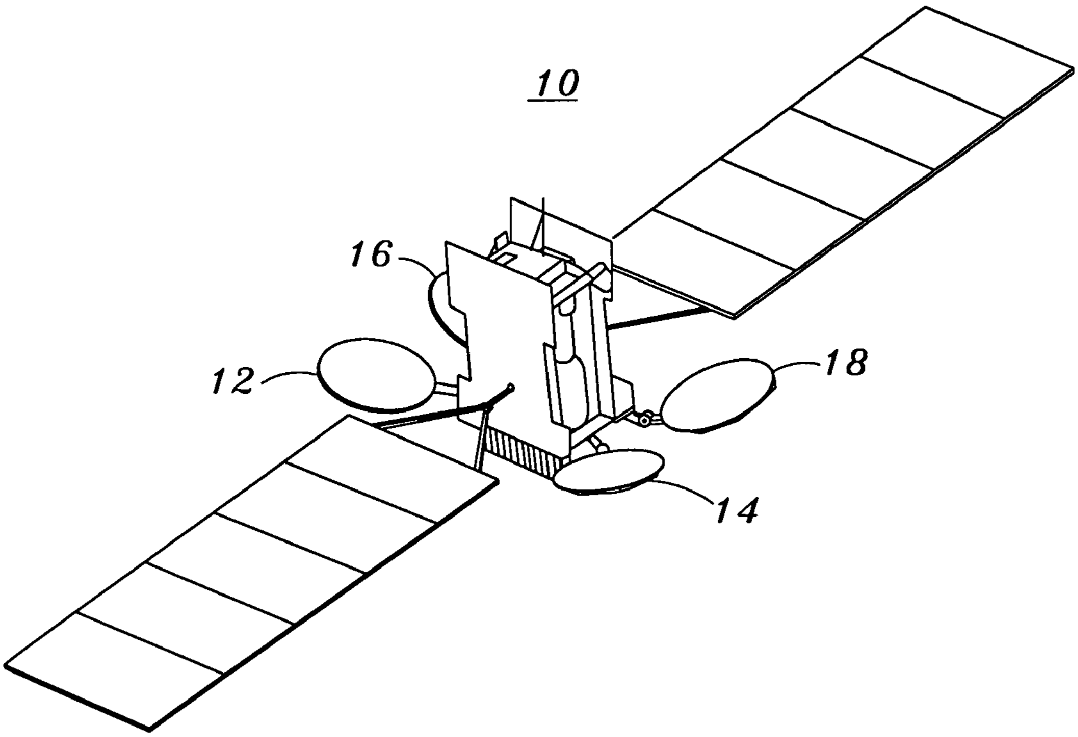
FIG. 1 shows an antenna system of the present disclosure mounted on a spacecraft body.

FIG. 1 illustrates an antenna system 10 mounted on a spacecraft body for producing multiple downlink and uplink beams. The antenna system 10 includes four shaped reflectors 12, 14, 16 and 18. Two of the reflectors may be deployed on the east side of the spacecraft, and two reflectors may be deployed on the west side of the spacecraft. Multiple feeds are provided to illuminate the respective reflectors. Each feed is diplexed to support transmission and reception. For example, four clusters of horns may be utilized to separately feed the respective reflectors.

Figure 2A:
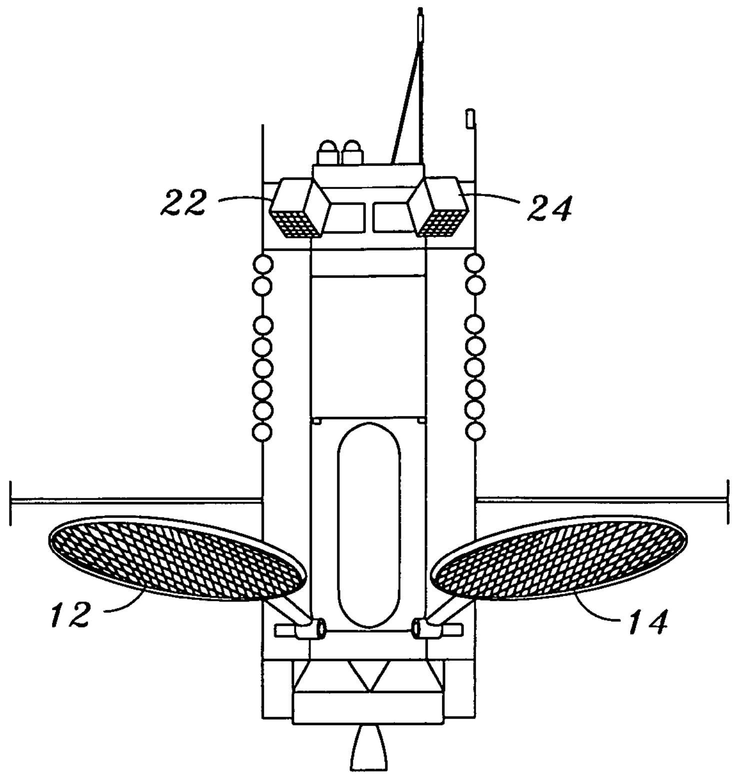
FIGS. 2A and 2B show reflectors and feed clusters of the antenna system in a deployed configuration.
Figure 2B:
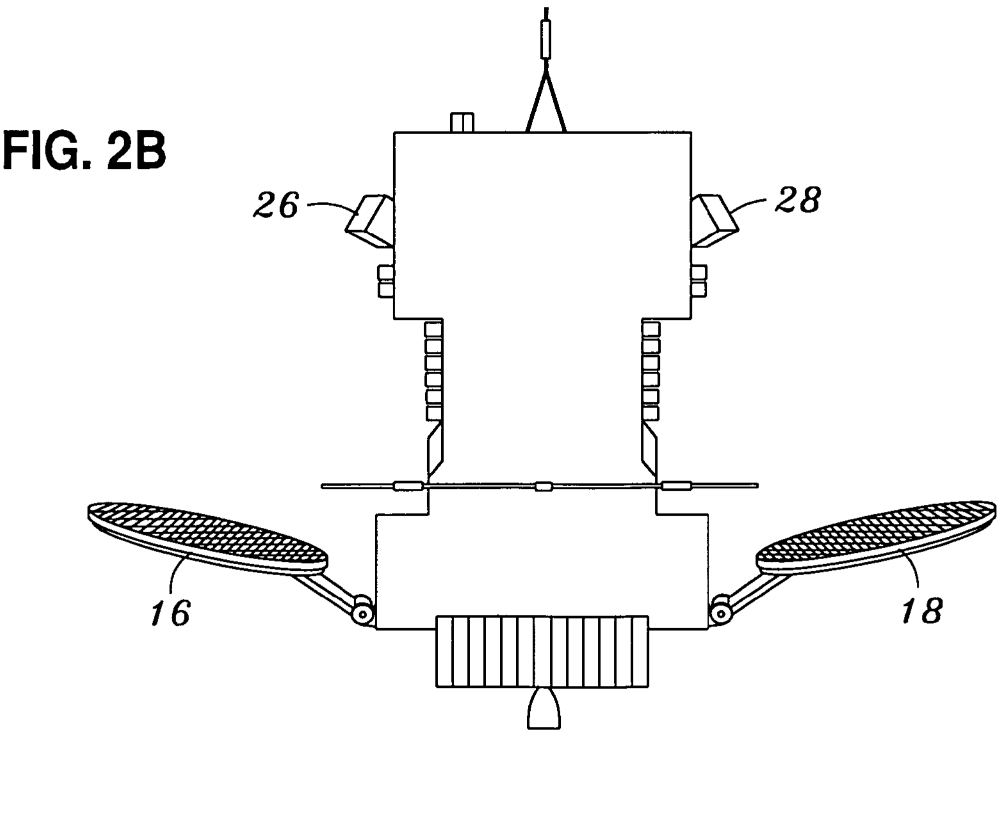

As shown in FIGS. 2A and 2B, horn clusters 22, 24, 26 and 28 are provided for feeding the reflectors 12, 14, 16 and 18, respectively. For example, each of the clusters 22-28 may include 17 feed horns for producing 17 beams. Hence, 68 beams may be formed by the four reflectors of the antenna system 10. Each of the reflectors may be deployed on-orbit using an antenna deployment mechanism.

Figure 3:
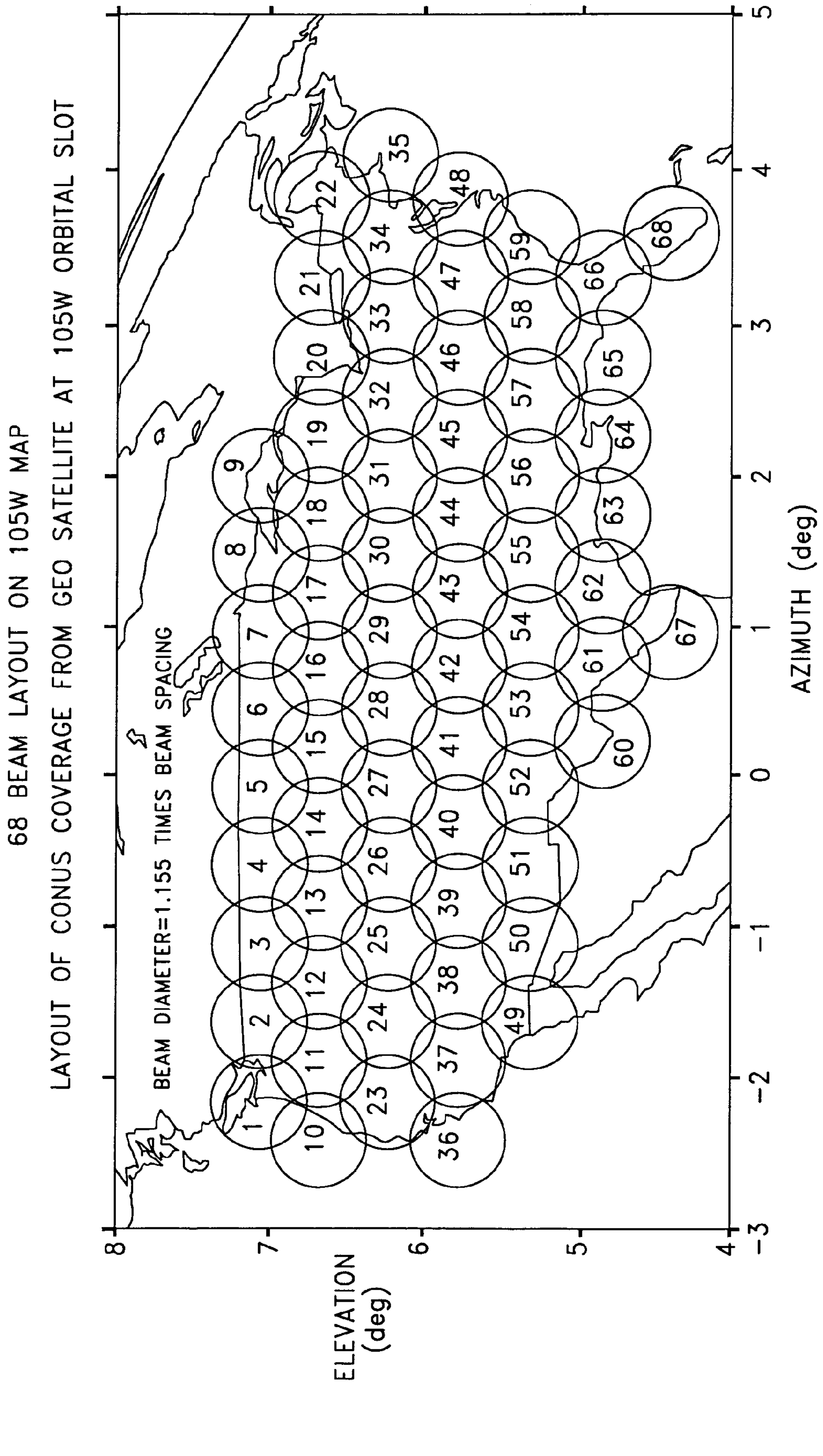
FIG. 3 illustrates a typical beam layout on the ground.

FIG. 3 illustrates a layout of these beams on the ground from a geostationary satellite located at 105 degrees W longitude orbital slot. The multi-beam layout has 68 overlapping circular beams that contiguously cover the Continental United States (CONUS). The beams are laid in a hexagonal matrix with an adjacent beam spacing of 0.52 degrees and beam diameter of 0.6 degrees at the triple-beam cross-over.

Figure 4:
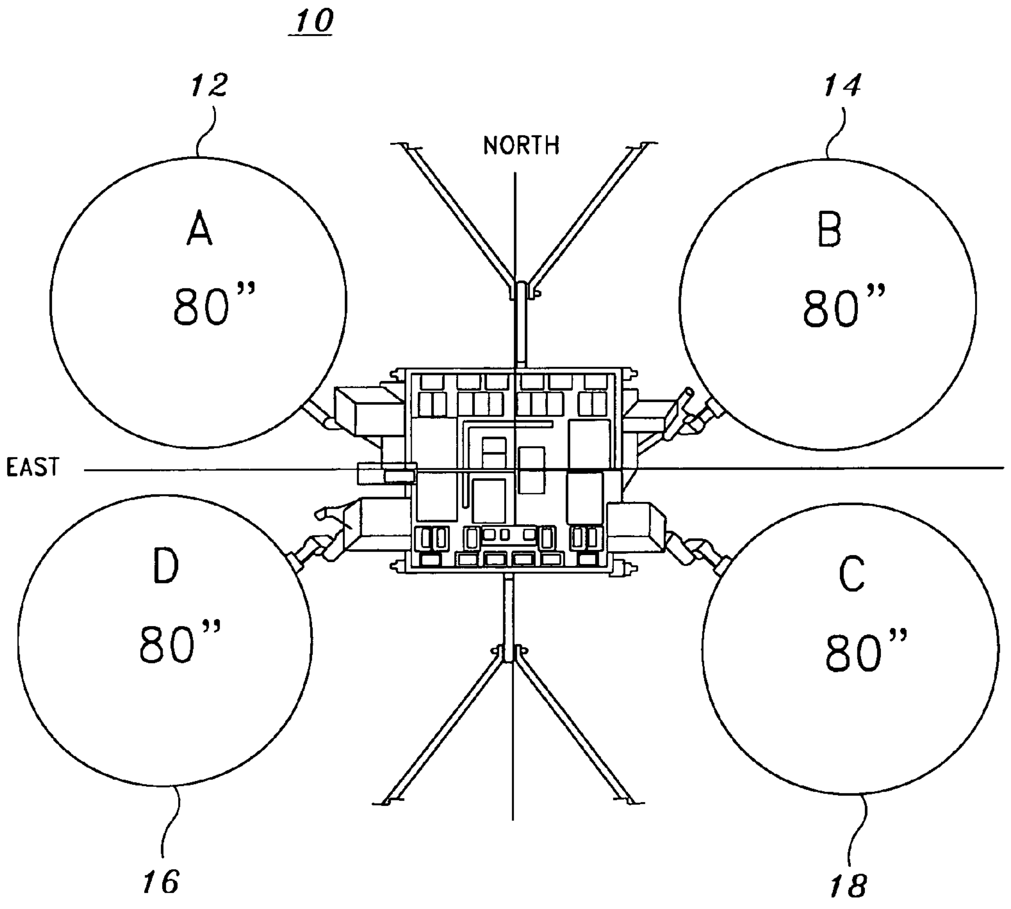
FIG. 4 shows four reflectors of the antenna system in the deployed configuration.
Figure 5:
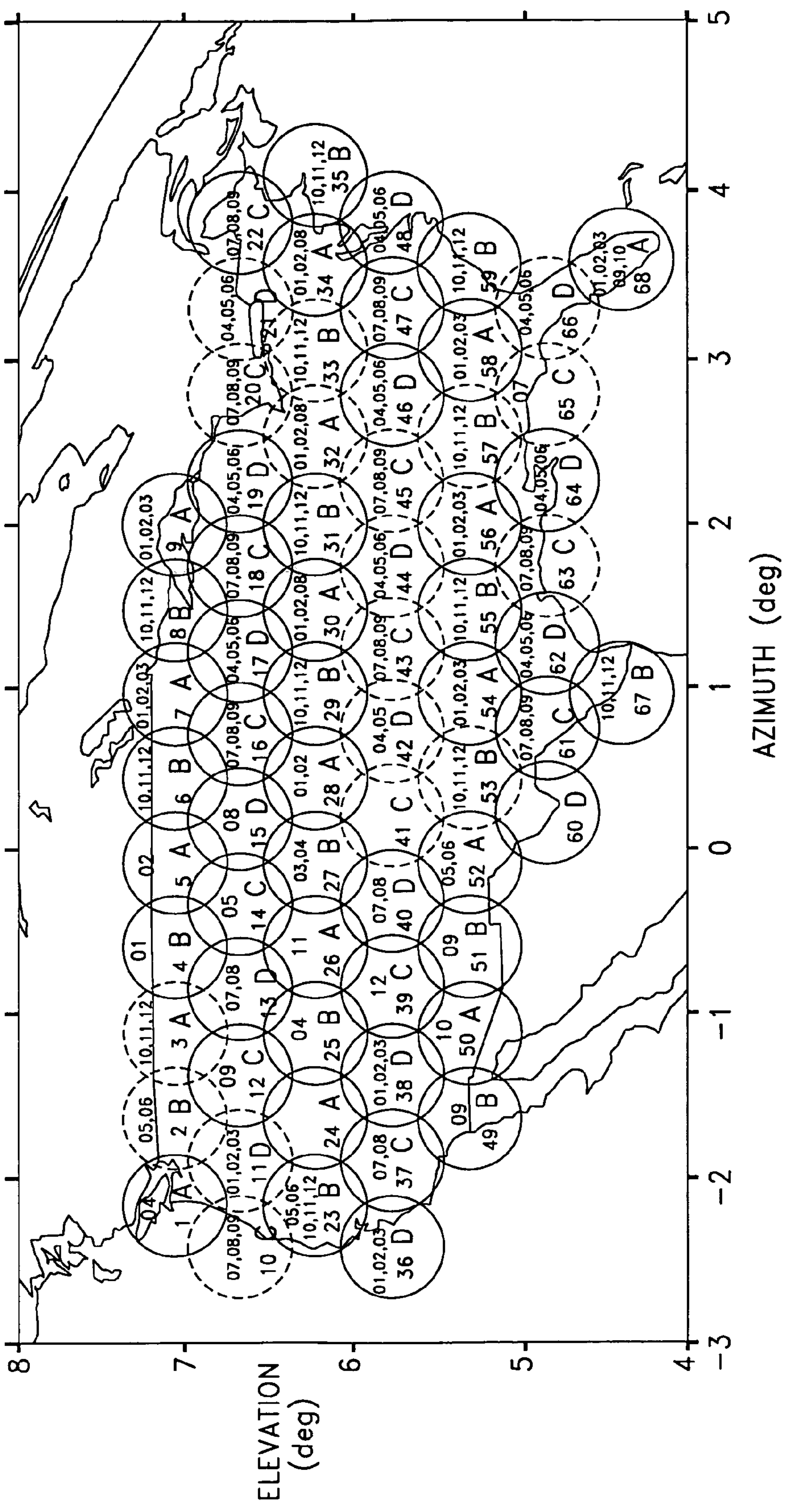
FIG. 5 illustrates beams assigned to each of the reflectors shown in FIG. 4 and frequency channels assigned within each beam.

The 68 beams are distributed among the four reflectors with alternate beams coming from the same reflector. FIG. 4 shows the four reflectors of the antenna system designated as reflectors A, B, C and D. FIG. 5 illustrates the beams produced by the respective reflectors. For example, reflector A generates beams 1, 3, 5, 7, etc., reflector B produces beams 2, 4, 6, 8, etc., reflector C produces beams 10, 12, 14, 16, etc., and reflector D generates beams 11, 13, 15 and 17, etc.

The multi-aperture arrangement of the antenna system 10 allows the horn size to be increased twice compared to a single-reflector arrangement where all beams are generated from a single reflector. Also, each reflector is illuminated more optimally in order to provide increased gain (about 3 dB higher than with a single reflector) and lower side lobes.

To improve co-polar isolation for downlink beams, each of the reflectors may be oversized. For example, each reflector may have a diameter of 80". Surface of each reflector may be shaped to broaden the uplink beams and maintain a predetermined beam size at both transmission and reception frequency bands. For example, the reflector surface may be shaped to maintain the uplink and downlink beam size at 0.6 degrees. Radio-frequency tracking may be used for each reflector to minimize the overall pointing error, for example, to 0.05 degrees. In addition, the antenna boresight is shifted closer to the region that uses 4-cell reuse (for example, eastern region of CONUS) in order to improve the C/I of the hybrid-cell scheme.

A predetermined number of frequency channels may be allocated for downlink and uplink beams produced by the antenna system 10. For example, as shown in FIG. 5, frequency channels 01 to 12 may be used for transmission and reception. The coverage region is composed of cells corresponding to the beams produced by the antenna system 10. The cells may be divided into a predetermined number of hubs, where each hub is assigned with all available frequency channels. As an example, beam #68 has five channels while beam #14 has a single channel.

Figure 6:
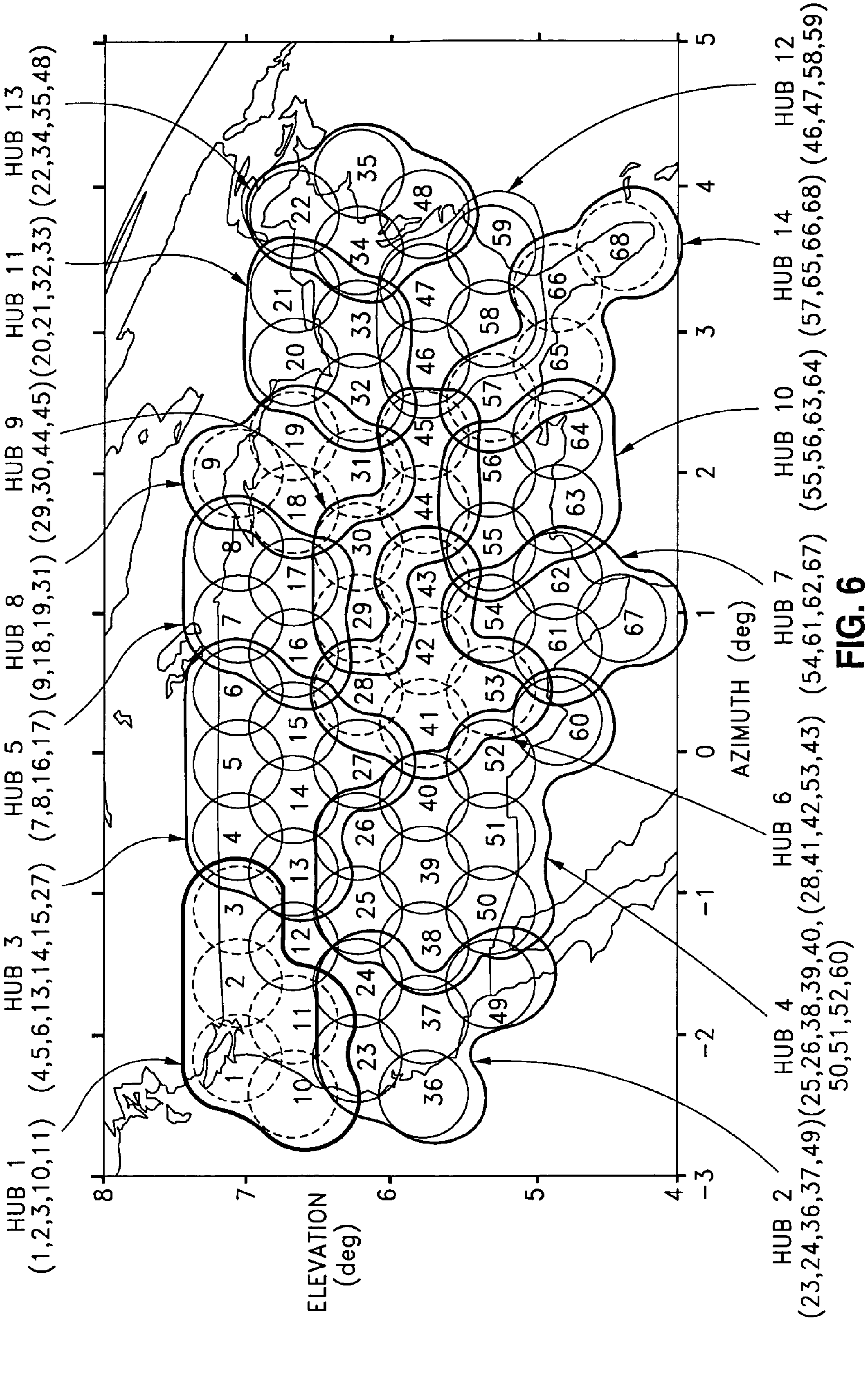
FIG. 6 illustrates a hub layout.

FIG. 6 shows an exemplary hub layout with 68 cells divided into 14 hubs. Each hub uses all the available channels 01 to 12, and has 4 to 8 beams allocated to each hub. For example, separate hubs may combine beams 1, 2, 3, 10 and 11, and beams 23, 24, 36, 37 and 49 on the West Coast. Hubs provided on the East Coast include, for example, the hub combining beams 22, 34, 35 and 48, and the hub combining beams 57, 65, 66 and 68.

As discussed above, conventional antenna systems use frequency-reuse schemes, such as 4-cell frequency-reuse scheme or 7-cell frequency-reuse scheme, with a fixed number of cells reusing the same frequency. The 4-cell frequency-reuse scheme is able to provide a high system capacity but has low C/I values. By contrast, the 7-cell frequency-reuse scheme limits the system capacity, but has better C/I values.

Figure 7:
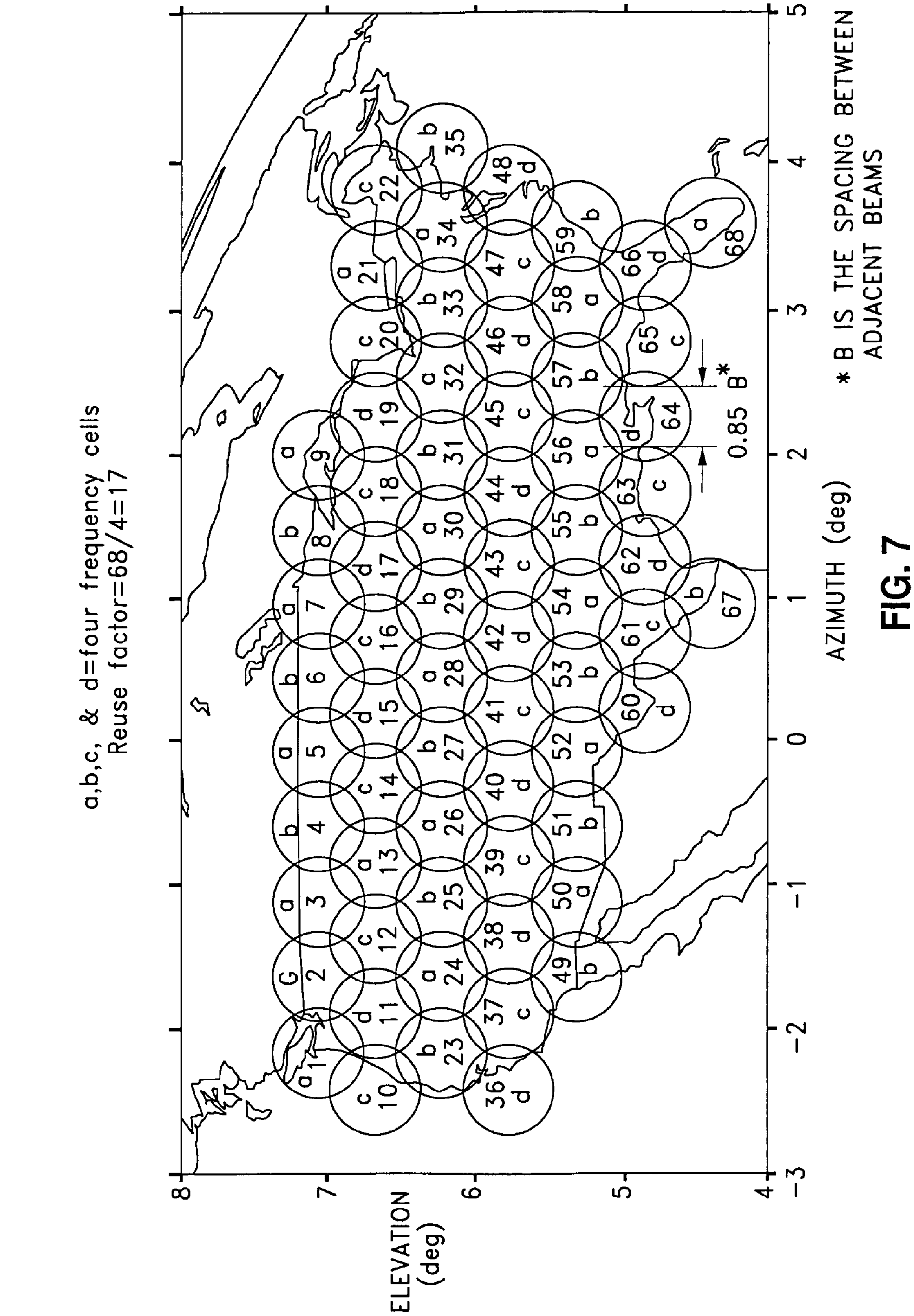
FIG. 7 illustrates a 4-cell frequency-reuse scheme.

FIG. 7 illustrates a beam layout of 68 beams with a 4-cell frequency-reuse scheme, where a, b, c, and d are four frequency cells. The closest spacing between adjacent beams that reuse the same frequency is about 0.85×B, where B is the spacing between adjacent beams. Therefore, this scheme provides a poor aggregate copolar isolation, which may be equal to about 10 dB. However, an advantage of this scheme is a high frequency-reuse factor $F_r$=68/4=17 enabling the antenna system to provide a high system capacity.

Figure 8:
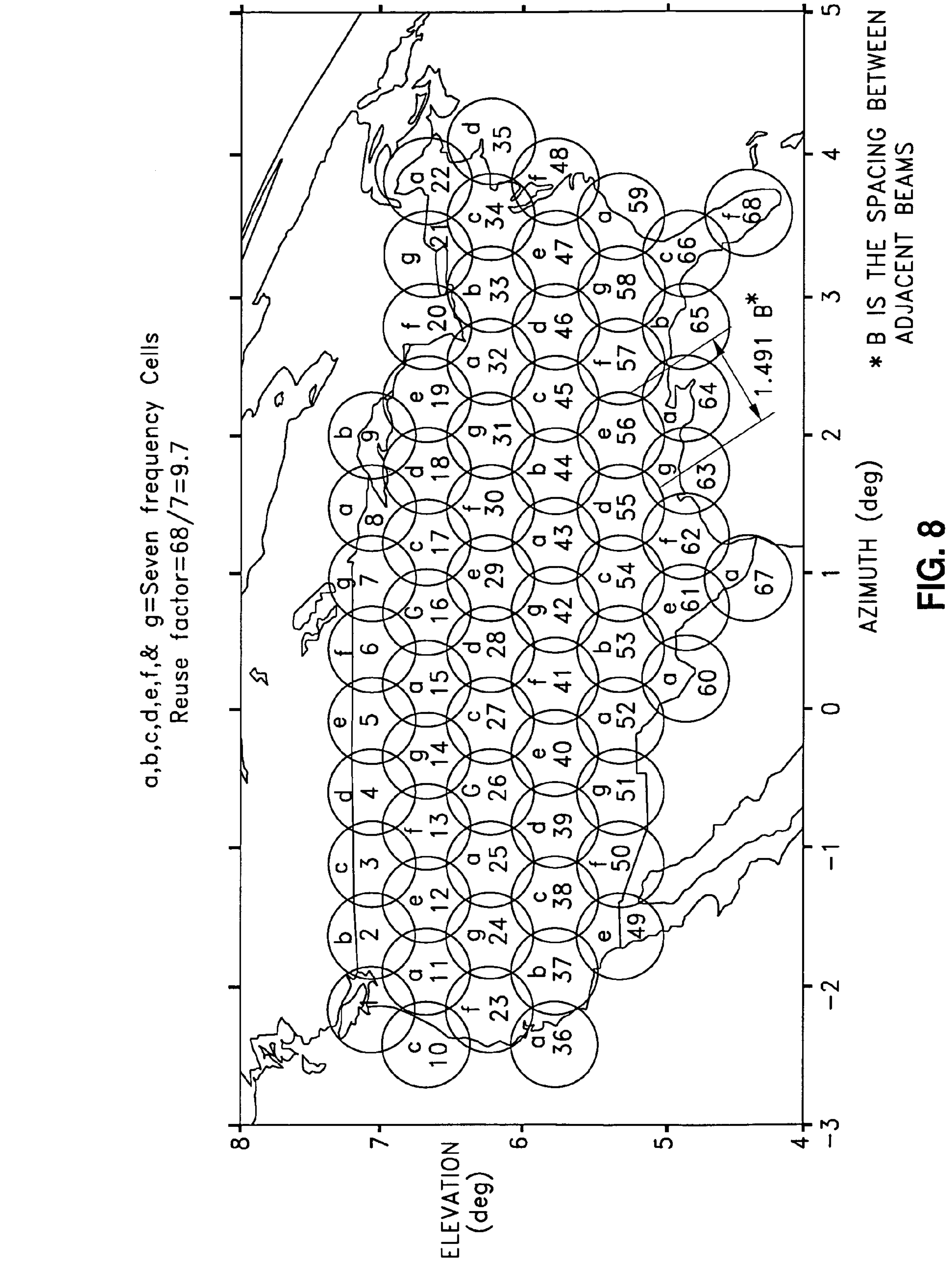
FIG. 8 illustrates a 7-cell frequency-reuse scheme.

FIG. 8 shows a beam layout of 68 beams with a 7-cell frequency-reuse scheme, where a, b, c, d, e, f, and g are seven frequency cells. The closest spacing between reuse beams in this scheme is increased to 1.491×B, resulting in a better aggregate copolar isolation of about 20 dB. However, this scheme provides a low frequency-reuse factor $F_r$=68/7=9.7.

Figure 9:
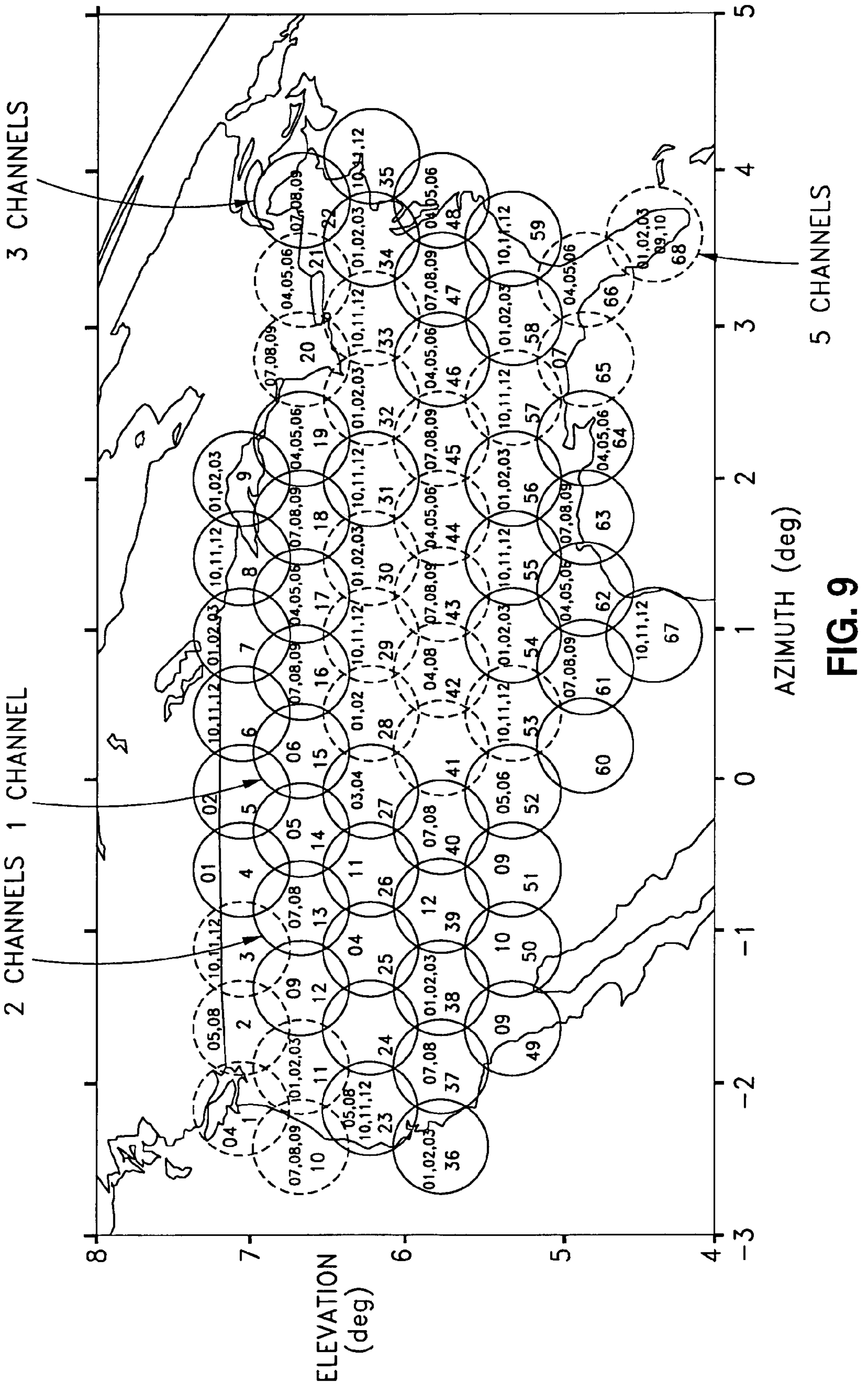
FIG. 9 illustrates a hybrid frequency-reuse scheme.

FIG. 9 illustrates an exemplary hybrid frequency-reuse scheme utilized in the antenna system 10. As discussed above, each hub is assigned with all available frequency channels 01 to 12. Specific frequency channels allocated to each of the beam in a hub is determined to satisfy the expected traffic demand in the respective cell and provide sufficient copolar isolation between the cells using the same frequency. The traffic demand may be defined as the average number of simultaneous demands for communications per unit of time.

To provide a required system capacity with sufficient copolar isolation, the antenna system 10 utilizes a novel hybrid frequency-reuse scheme in which a variable number of cells reuse the same frequency channel. For example, while cells 22 and 47 on the East Coast use frequency channels 07, 08 & 09 in a 4-cell frequency-reuse scheme, cells 2, 14, and 52 in the western portion of the country use frequency channel 05 in a 7-cell frequency-reuse scheme.

The number of cells reusing the same frequency channel varies depending on the traffic demand in an area in which a specific cell is located. For example, in high-demand areas, a 4-cell frequency-reuse scheme may be utilized to provide a higher system capacity with lower copolar isolation; whereas in low-demand areas, a 7-cell frequency-reuse scheme may be employed to increase the copular isolation.

Figure 10:
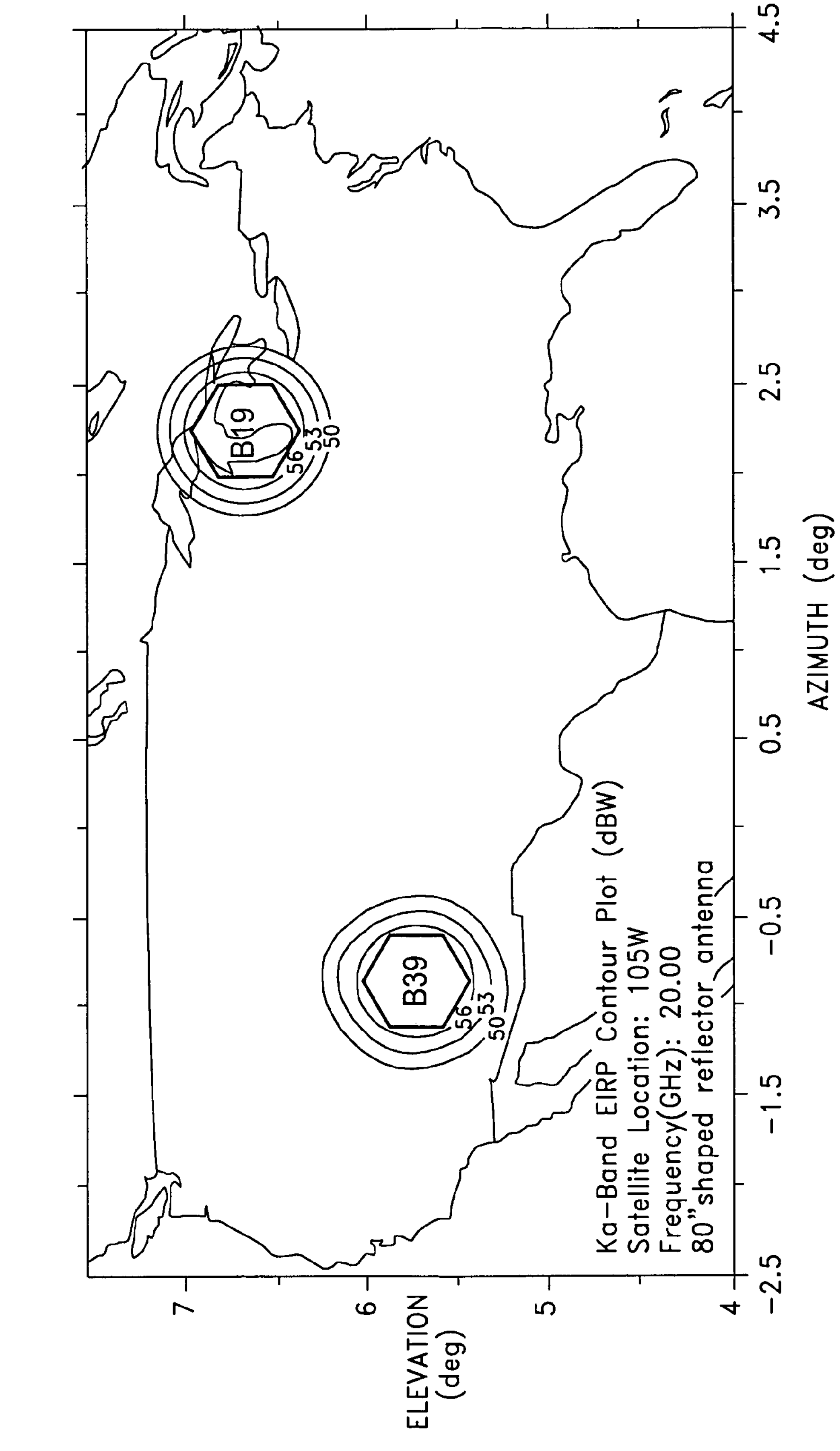
FIG. 10 shows computed effective isotropic radiated power (EIRP) patterns for beams in a 4-cell frequency-reuse scheme and in a 7-cell frequency-reuse scheme.

FIG. 10 shows computed effective isotropic radiated power (EIRP) patterns for beam 19 in a 4-cell frequency-reuse scheme and beam 39 in a 7-cell frequency-reuse scheme using an 80" diameter reflector on the transmit. The hexagonal coverage cells are shown along with 56, 53 & 50 dBW contours. Minimum EIRP over these two beams is greater than 56 dBW.

Figure 11:
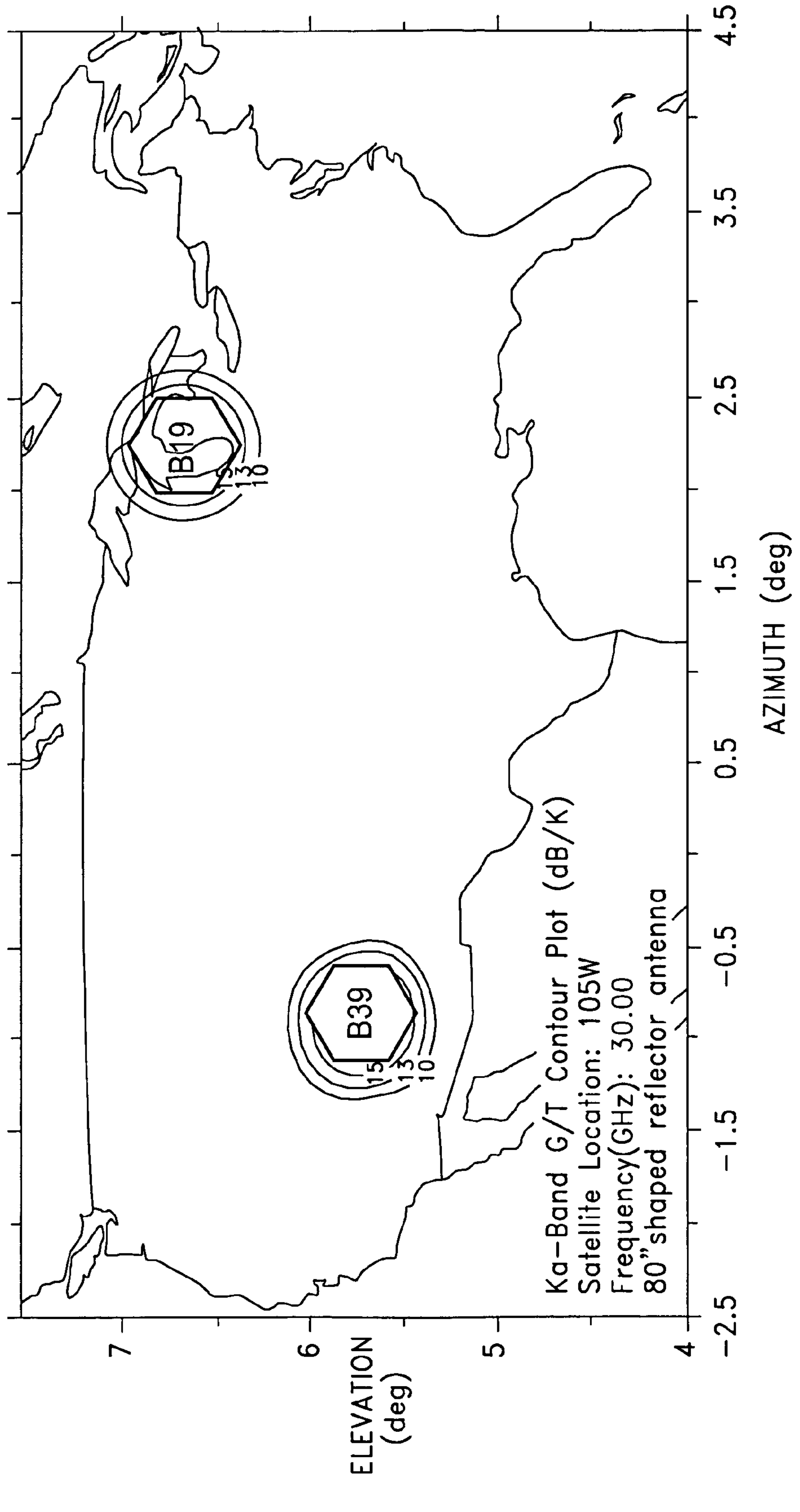
FIG. 11 shows gain-to-noise temperature (G/T) contours for uplink beams.

FIG. 11 shows gain-to-noise temperature (G/T) contours for the beams 19 and 39 on the receive. Minimum G/T is greater than 15 dB/K.

Figure 12:
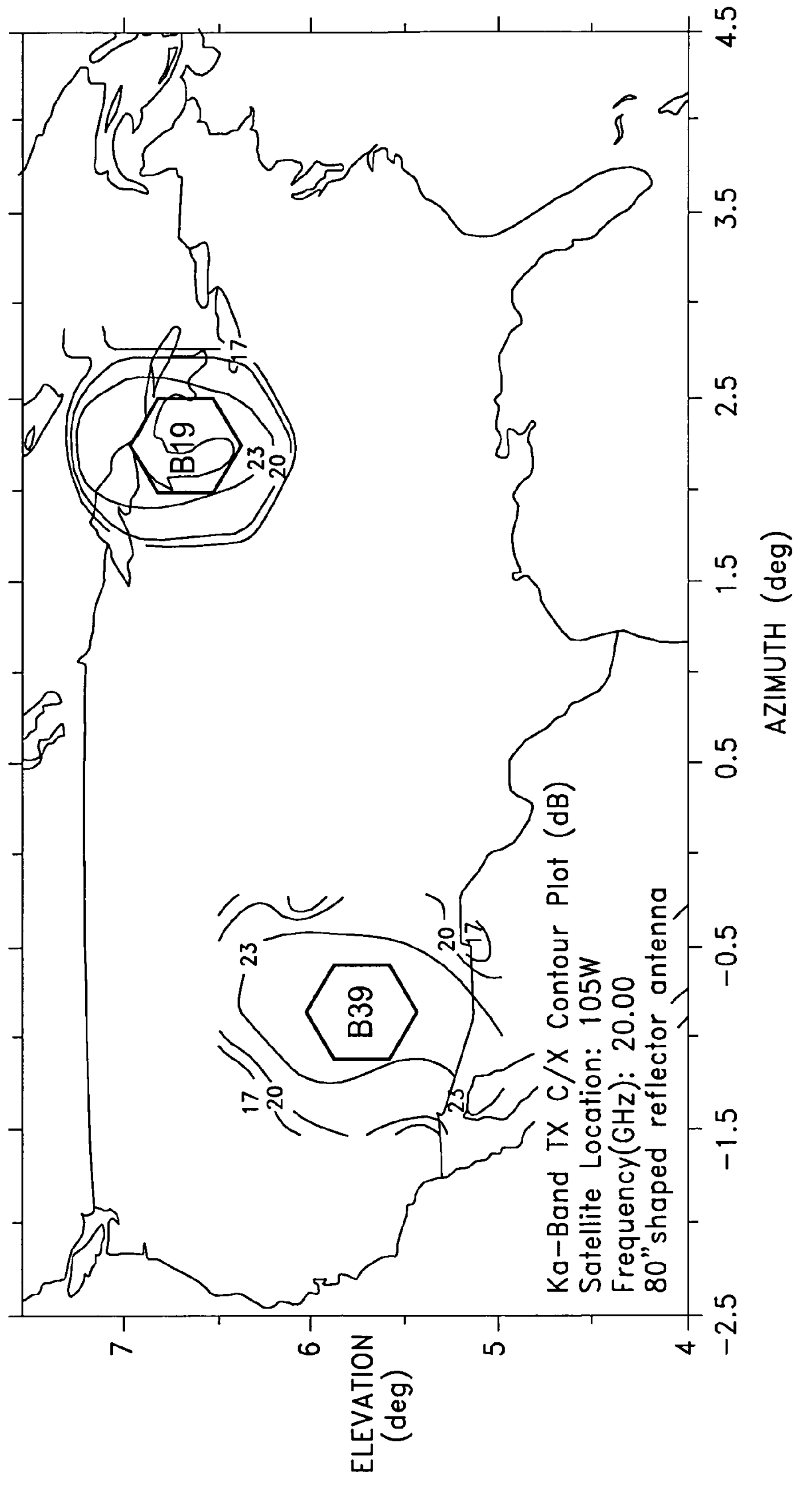
FIG. 12 shows computed copolar isolation (C/I) contours for downlink beams.

FIG. 12 shows computed copolar isolation (C/I) contours for transmit beams 19 and 39. These contours indicate that beam 19 in a 4-cell frequency-reuse scheme has C/I of about 13 dB, whereas beam 39 in a 7-cell frequency-reuse scheme has C/I of about 17 dB.

Figure 13:
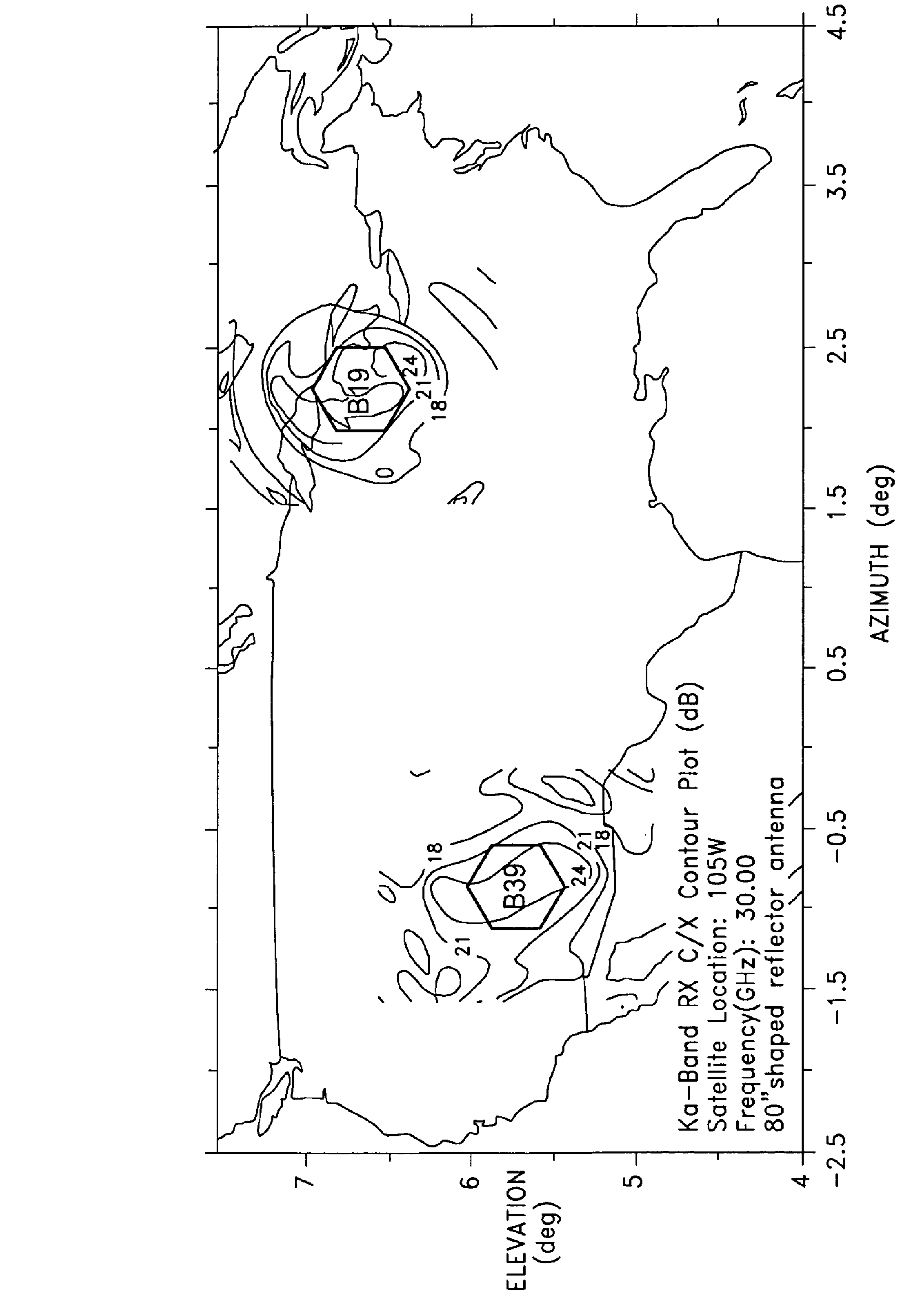
FIG. 13 shows cross-polar isolation contours for the downlink beams.
Figure 14:
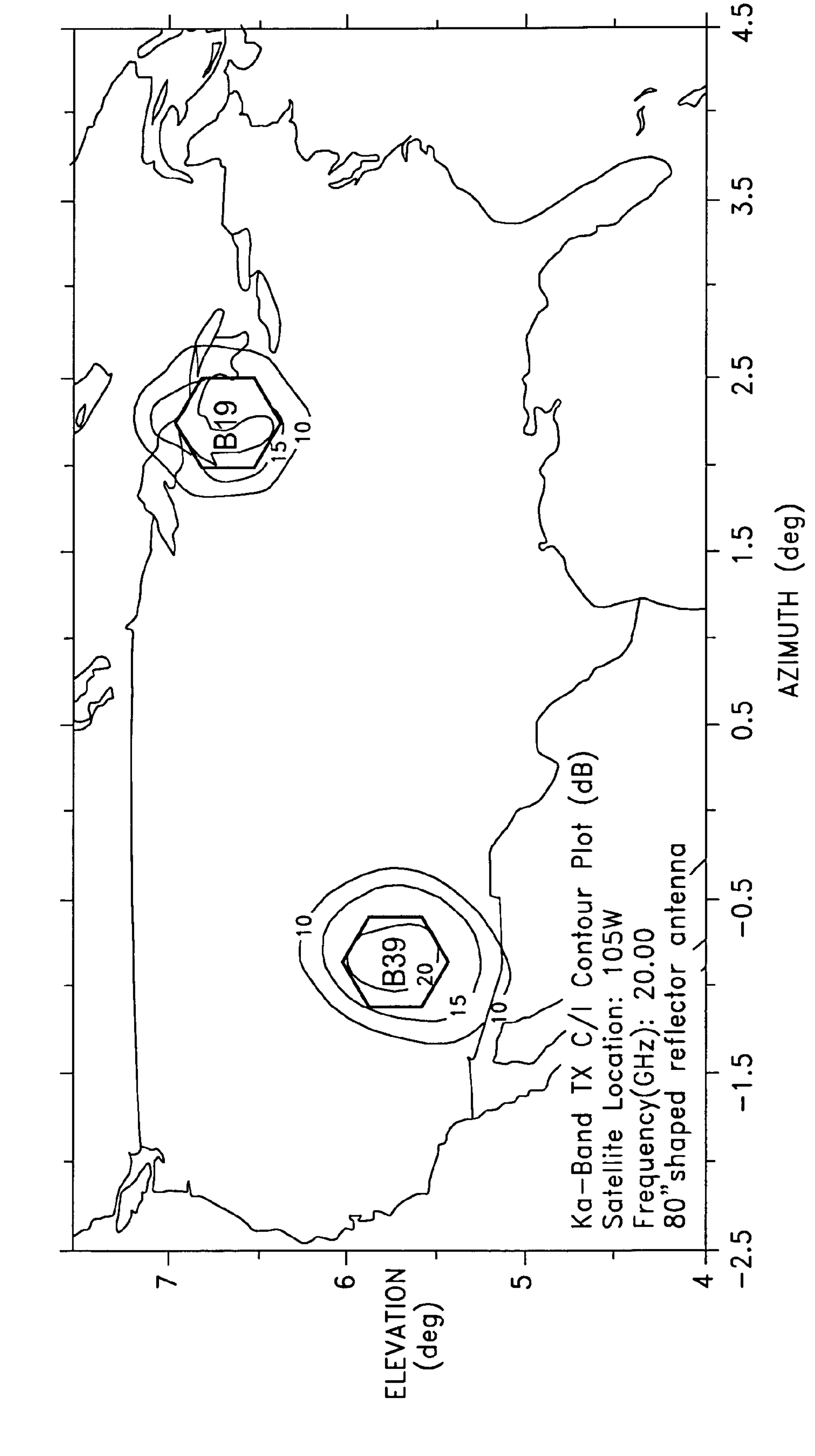
FIG. 14 shows cross-polar isolation contours for the uplink beams.

FIG. 13 shows cross-polar isolation contours for transmit beams 19 and 39. The contours show that this value is better than 17 dB for both beams. FIG. 14 shows cross-polar isolation contours for receive beams 19 and 39.

Figure 15:
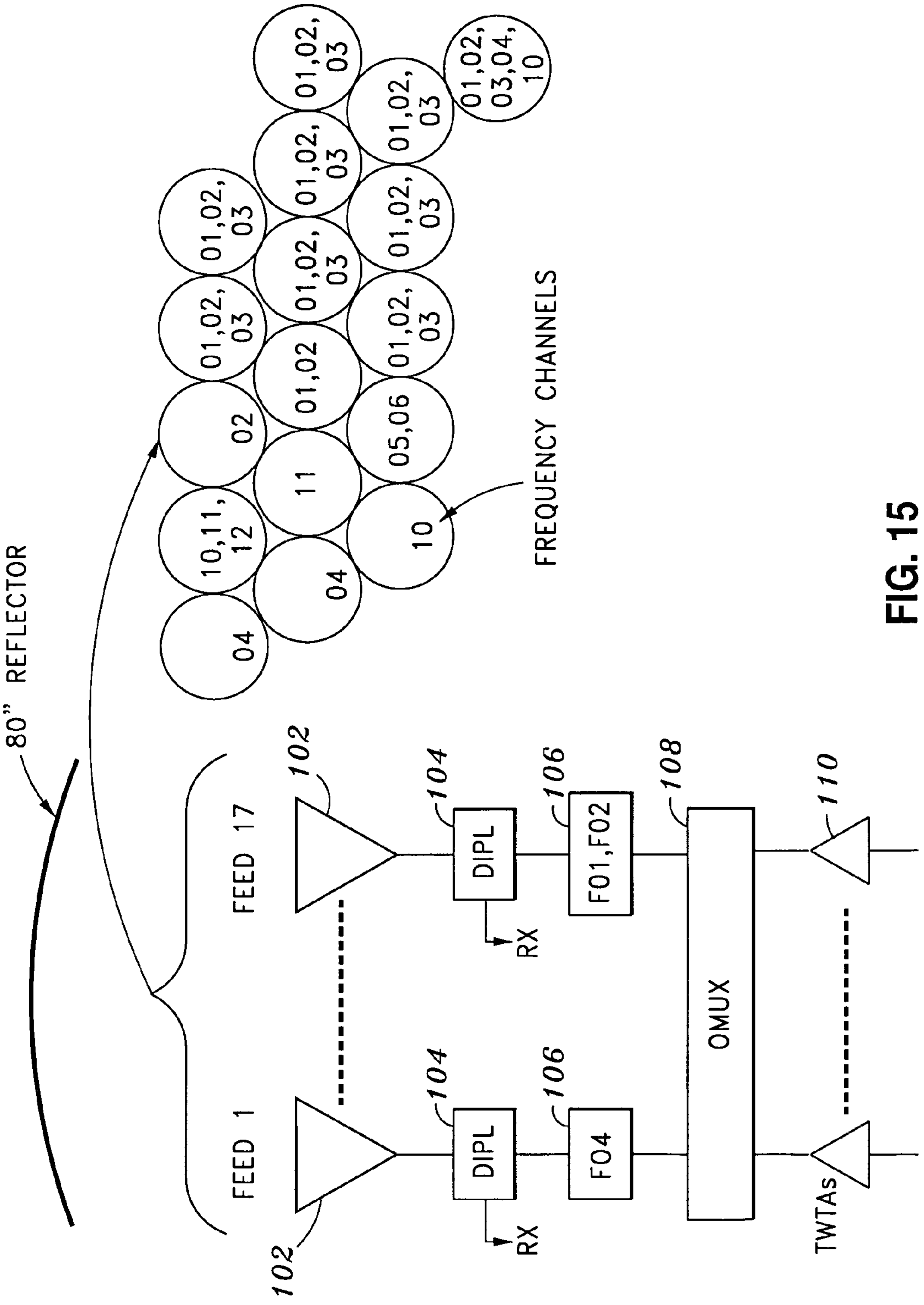
FIG. 15 shows a simplified antenna arrangement for assigning frequency channels to produced beams.

FIG. 15 shows a simplified antenna arrangement for assigning frequency channels to produced beams. Only feeds 1 to 17 illuminating one of the antenna reflectors are shown to illustrate frequency channel allocation among beams produced by the respective feeds. However, the frequency channel allocation for the remaining feeds of the antenna system 10 is carried out in a similar manner.

Each feed 102 is coupled to a diplexer 104 that separates the transmit and receive signals with sufficient isolation. The diplexer 104 is supplied with a transmit signal from a channel filter 106 corresponding to an allocated frequency channel. For example, the channel filter for frequency channel 04 is utilized, if the beam produced by the respective feed is assigned with frequency channel 04. Similarly, the channel filter for frequency channels 01 and 02 is provided, if the beam produced by the respective feed is assign with frequency channels 01 and 02. Also, the diplexer 104 is connected to a receive line RX to support the reception from the respective feed. Output multiplexer (OMUX) 108 supplies transmit signals from Traveling Wave Tube Amplifiers (TWTAs) 110 to the respective feeds 102.

Hence, the antenna system 10 is able to assign various groups of the produced beams with frequency channels in accordance with different frequency-reuse schemes depending on the traffic demand. For example, as discussed above, one group of the beams covering the East Coast of the USA may be assigned with frequency channels in accordance with a 4-cell frequency-reuse scheme, and another group of the beams covering the West Coast of the USA may be assigned with frequency channels in accordance with a 7-cell frequency-reuse scheme. As a result, the antenna system 10 is able to substantially increase the system capacity while minimizing the interference between the beams reusing the same frequency channels.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. An antenna system for producing multiple beams, comprising:

multiple feeds; and a number of reflectors configured to form one beam for each of the multiple feeds, wherein the antenna system is configured to assign the multiple beams with frequency channels in accordance with population or geographic demands for the frequency channels in areas covered by respective ones of the multiple beams, wherein at least a first group of the multiple beams is assigned with the frequency channels in accordance with a first frequency-reuse scheme, and at least a second group of the multiple beams is assigned with the frequency channels in accordance with a second frequency-reuse scheme different from the first frequency-reuse scheme, and wherein the first group of the multiple beams corresponds to a first area covered by the multiple beams, and the second group of the multiple beams corresponds to a second area covered by the multiple beams.

2. The antenna system of claim 1, wherein the first group of the multiple beams includes a first number of beams representing all available frequency channels, and the second group of the multiple beams includes a second number of beams representing all available frequency channels.

3. The antenna system of claim 2, wherein the first number of beams corresponding to the first frequency-reuse scheme is less than the second number of beams corresponding to the second frequency-reuse scheme if a frequency channel demand in the first area is higher than a frequency channel demand in the second area.

4. The antenna system of claim 1, wherein the multiple feeds are combined into a number of sets.

5. The antenna system of claim 4, wherein a separate reflector is configured to accommodate each set of the multiple feeds.

6. The antenna system of claim 5, wherein each reflector is configured to provide transmission and reception at transmission and reception frequencies of the frequency channels assigned to the beams corresponding to the respective set of the multiple feeds.

7. The antenna system of claim 6, wherein each reflector is configured to support transmission and reception at separated transmission and reception frequency bands respectively corresponding to the transmission and reception frequencies of the frequency channels.

8. The antenna system of claim 6, wherein a surface of each reflector is shaped to broaden receive beams and maintain a predetermined beam size at both transmission and reception frequency bands.

9. The antenna system of claim 6, wherein a surface of each reflector is shaped to improve co-polar isolation.

10. A method of producing multiple beams, comprising the steps of:

assigning at least a first group of the multiple beams with frequency channels in accordance with a first frequency-reuse scheme; and assigning at least a second group of the multiple beams with the frequency channels in accordance with a second frequency-reuse scheme different from the first frequency-reuse scheme, wherein the assigning at least the first group and assigning at least the second group are in accordance with population or geographic demands for the frequency channels in areas covered by respective ones of the multiple beams, and wherein the first group of the multiple beams corresponds to a first area covered by the multiple beams, and the second group of the multiple beams corresponds to a second area covered by the multiple beams.

11. The method of claim 10, wherein the first group of the multiple beams includes a first number of beams representing all available frequency channels, and the second group of the multiple beams includes a second number of beams representing all available frequency channels.

12. The method of claim 11, wherein the first number of beams corresponding to the first frequency-reuse scheme is less than the second number of beams corresponding to the second frequency-reuse scheme if a frequency channel demand in the first area is higher than a frequency channel demand in the second area.

* * * * *